Oct. 14, 1924.
J. P. HENDERSON
1,511,832
THRASHING MACHINE GRATE
Filed March 25, 1920
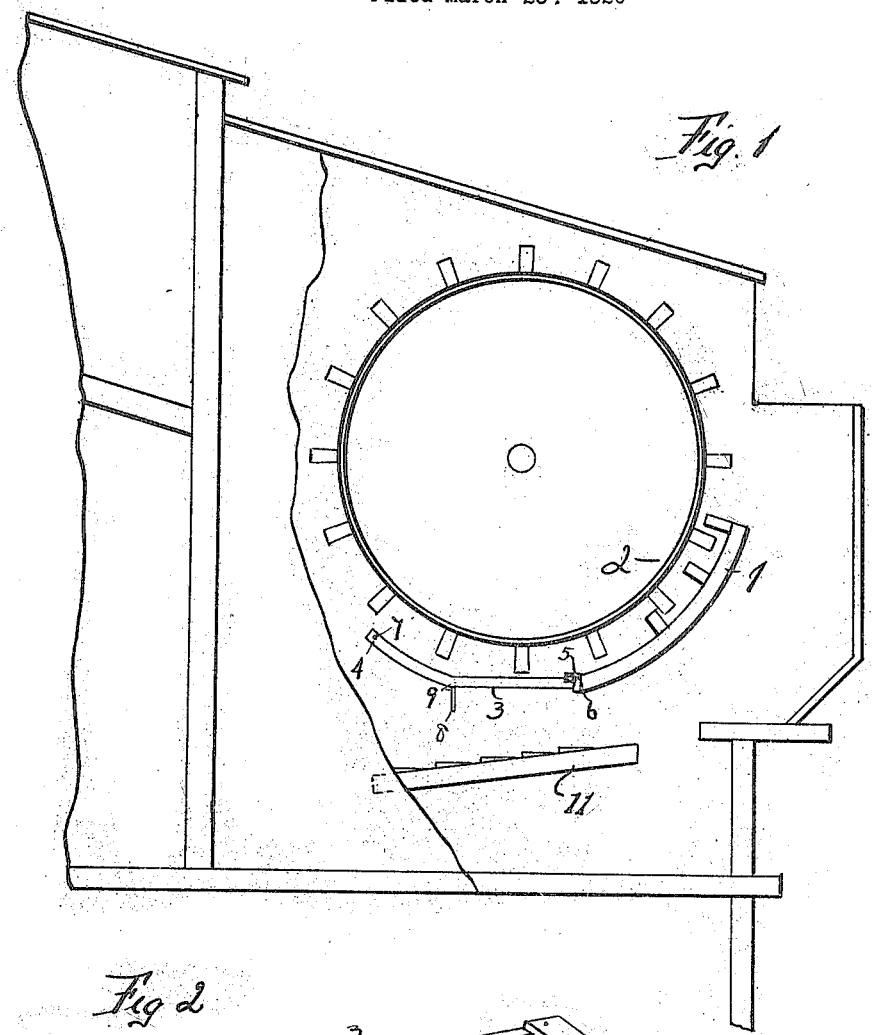
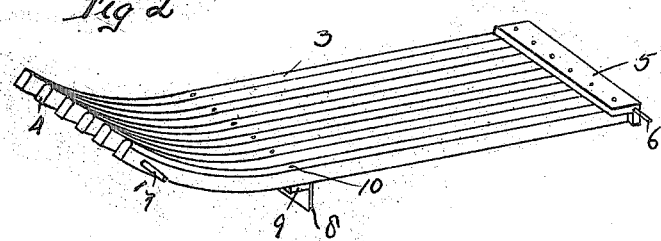
Inventor
James P. Henderson
By
W. W. Williamson
Atty Patented Oct. 14, 1924.

1,511,832

UNITED STATES PATENT OFFICE.

JAMES P. HENDERSON, OF ROCHELLE, ILLINOIS.

THRASHING-MACHINE GRATE.

Application filed March 25, 1920. Serial No. 368,504.

*To all whom it may concern:*

Be it known that I, JAMES P. HENDERSON, a citizen of the United States, residing at Rochelle, in the county of Ogle and State of Illinois, have invented new and useful Improvements in Thrashing-Machine Grates, of which the following is a specification.

My invention relates to a thrashing machine, and has for its object to provide a grate for such machine of such construction as will be readily attachable to the separator and which will readily permit the grain to pass therethrough while the straw is passing thereover.

With this end in view, this invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawing forming a part of this application, in which:—

Fig. 1, is a fragmental view of a thrashing machine one side being broken away to show my improvement properly applied thereto.

Fig. 2, is an enlarged perspective view of the grate.

Fig. 3, is an enlarged cross section of one of the grate bars.

In carrying out my invention as here embodied, 1 represents the concave and 2 the cylinder which is suitably mounted in proper operated position with relation to the concave and adapted to revolve within the frame of the machine.

3 represents the grate over which the straw containing the grain passes immediately after the straw is subjected to the action of the cylinder 2. The grate 3 is composed of the bars 4 the upper edges of which are rounded in cross section and secured by rivets or otherwise to the cross head 5 which latter is provided with the lugs 6 adapted to project into a suitable portion of the frame of the machine for supporting this end of the grate the opposite end of the bars being provided with the lugs 7 for securement of this end of the bars to the frame. 8 represents an apron or depending plate secured to the underside of the grate bars intermediate their ends and held in place by the cross strip 9 through which the rivets 10 pass.

In practice the greater portion of the grain separated from the straw falls through the concave 1 to the shaking grain pan 11 which as the straw moves over the grate bars toward the straw decks carrying a considerable quantity of the grain therewith this grain is separated from the straw as the latter is moved up the curved portions of the grate bars and on account of the top of the grate bars being rounded in cross section the grain finds no lodgment, but readily passes through the bars to the shaking pan 11.

By actual test I have found that a relatively large percentage of grain which has heretofore been lost by being carried over with the straw is separated therefrom and deposited in the shaking pan thereby accomplishing a great saving without any increased cost of labor and as my present improvement is readily attachable to any thrashing machine its advantages are obvious.

Of course I do not wish to be limited to the exact details of construction as herein shown as these may be varied within the limits of the appended claim without departing from the spirit of my invention.

Having thus fully described my invention what I claim as new and useful is:—

A grate for thrashing machines comprising a plurality of parallel bars, one end of each of said bars being curved upward, a cross head secured to said bars at the end opposite the curved portions, said cross head carrying means for connection with a concave, a single cross strip secured to the undersides of said bars in the region of their curved ends and an apron depending from said cross strip.

In testimony whereof, I have hereunto affixed my signature.

J. P. HENDERSON.